No. 619,545. Patented Feb. 14, 1899.
C. CULMANN.
PURIFYING OILS.
Application filed Dec. 24, 1897.
(No Model.)
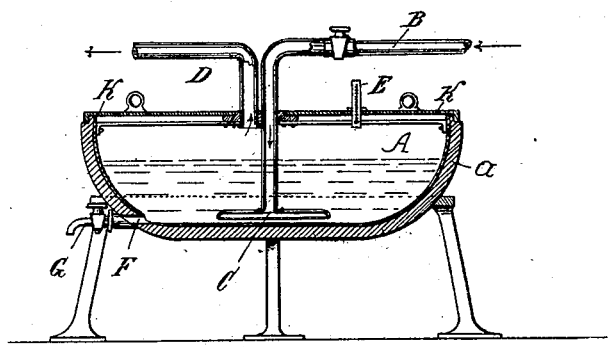

UNITED STATES PATENT OFFICE.

CHARLES CULMANN, OF HAMBURG, GERMANY.

PURIFYING OILS.

SPECIFICATION forming part of Letters Patent No. 619,545, dated February 14, 1899.

Application filed December 24, 1897. Serial No. 663,402. (No specimens.)

*To all whom it may concern:*

Be it known that I, CHARLES CULMANN, trade chemist, of No. 23 Alte Gröningerstrasse, Hamburg, in the Empire of Germany, have invented an Improved Process of Deodorizing Oils and Fatty Substances, of which the following is a specification, reference being had therein to the accompanying drawing.

This process for deodorizing oils and fatty substances enables the usual beating or "stirring" (during which acids and lyes are generally added) and the tedious washing to be dispensed with, the formation of emulsions, which invariably takes place with disturbing effect in the course of the purification of trainoil, (blubber, cod-liver oil, or the like,) to be avoided, and the oil or fat to be purified or refined in one single considerably-simplified operation. These advantages are attained mainly by subjecting the oil or fat simultaneously to the action of bodies whose reaction is acid (especially alum or aluminium sulfate) used in the condition of a saturated solution and to the influence of superheated steam. In order to obviate a dilution of the chemicals employed and the formation of an emulsion in this process, the oil or fat to be deodorized is further heated externally or prevented from cooling by thermal insulation, while the steam sent through is so controlled that the proportion of water contained in the material which is being treated either remains constant or diminishes.

The accompanying drawing shows an apparatus adapted for carrying out my process, the same consisting of a jacketed kettle A, whose jacket $a$ contains or is composed of suitable heat-insulating material to prevent conduction or radiation of heat from the kettle. Steam is admitted by the pipe B, which may be provided at its lower end with a plate C, having small holes to distribute the steam throughout the whole mass of oil. The kettle is provided with a detachable lid K, fitted with a pipe D to allow the vapors arising during the process to escape. A thermometer E is inserted in the lid and the oil may be run out after treatment through the outlet F, which is provided with a suitable stop-cock G.

The following is an example of the performance of the process in practice: One hundred kilograms of oil are mixed with from two to four per cent. (according to the nature of the oil) of a cold saturated aqueous solution of alum or of aluminium sulfate and treated with steam at a temperature of from 108° to 110° centigrade. The combined action of steam at that temperature and of the chemicals named will effect the separation of the offensive matter, partly in the form of a gluey mass and partly in a volatile condition, the latter portion being carried away by the steam. Thus the impurities will be removed without in the least affecting the oil itself.

In order to prevent any of the steam from being condensed, and the solution of the chemical agent employed from becoming more dilute in consequence, as such a dilution would necessarily result in an emulsion, the receiver should, during the operation, be surrounded by a bad heat-conductor or be heated, while the circulation of the steam, which is kept at a temperature of from 108 to 110° centigrade, should be so regulated that the amount of water present should tend to diminish rather than increase. After the steam circulation has been kept up for from two to four hours and when the last trace of an offensive odor has disappeared the steam is cut off and the oil is left standing at rest. Then almost instantaneously the oil will neatly separate from the solution of its own accord without any emulsion forming, so that the pure oil may be drawn off a very short time after. The oil is allowed to deposit its sediment in the receivers, which are maintained at a temperature of about 80° centigrade, and it will be found to clear comparatively quickly, the final product being a perfectly limpid and inodorous oil. In fact, it will resume none of its former nauseous odor even if it should be heated, which some of the apparently inodorous fish-oils do, so that any subsequent washing or filtering becomes unnecessary.

The process described is essentially serviceable in deodorizing whale and seal blubber, cod-liver oil, or the like, and it also may be extended to other fats, especially the various sorts of tallow. By it odorless and tasteless oils may be prepared with or without the cooperation of heat, which will in their properties or behavior prove exactly similar to the oils obtained by boiling lard.

One main advantage which this process offers to the manufacturer is that he is no longer under the necessity of working the fat of animals immediately after collecting it in order to produce the finer kinds of oil.

What I claim, and desire to secure by Letters Patent of the United States, is—

1. A process for deodorizing oil and fat, consisting in subjecting the oil or fat simultaneously to the action of chemicals having an acid reaction (such as alum or aluminium sulfate) in the state of a saturated solution, and to the action of superheated steam, substantially as described.

2. A process for deodorizing oil and fat, consisting in subjecting the oil or fat simultaneously to the action of chemicals having an acid reaction such as aluminium or aluminium sulfate in the state of a saturated solution, and to the action of superheated steam, and, with a view to avoiding the dilution of the chemicals and the formation of an emulsion, subjecting the substance under the treatment to external heating or thermal insulation and admitting the steam under such conditions that the proportion of water contained in the material does not increase, substantially as described.

In witness whereof I have hereunto set my hand in presence of two witnesses.

CHARLES CULMANN.

Witnesses:
CARL ENOCH,
GUSTAV WEHR.